United States Patent [19]

Rogers et al.

[11] Patent Number: 5,215,730
[45] Date of Patent: Jun. 1, 1993

[54] PRODUCTION OF SODIUM PERBORATE CRYSTALS HAVING IMPROVED ABRASION RESISTANCE

[75] Inventors: Janet M. Rogers, Cordova; Linda F. Tolbert, Memphis, both of Tenn.; Harold F. Porter, deceased, late of Hockessin, Del., by C. Lavon Porter, Administratrix; Daniel A. Green, Moylan, Pa.

[73] Assignee: E. I. du Pont de Nemours and Company, Wilmington, Del.

[21] Appl. No.: 784,242

[22] Filed: Oct. 29, 1991

Related U.S. Application Data

[63] Continuation-in-part of Ser. No. 607,756, Oct. 31, 1990, abandoned.

[51] Int. Cl.$^5$ .......................... C01B 15/12; C01D 1/30
[52] U.S. Cl. .................................. 423/281; 23/302 T
[58] Field of Search ....................... 423/281; 23/302 T

[56] References Cited

U.S. PATENT DOCUMENTS

| | | | |
|---|---|---|---|
| 3,598,524 | 8/1971 | Reilly | 423/281 |
| 3,985,862 | 10/1976 | Knippschild et al. | 23/302 T |

FOREIGN PATENT DOCUMENTS

| | | | |
|---|---|---|---|
| 1015835 | 1/1966 | United Kingdom | 423/281 |
| 2014554 | 8/1979 | United Kingdom | 423/281 |

*Primary Examiner*—Wayne Langel
*Attorney, Agent, or Firm*—P. Michael Walker

[57] ABSTRACT

A method for improving abrasion resistance of sodium perborate tetrahydrate crystals prepared by reacting sodium metaborate with hydrogen peroxide in an aqueous slurry crystal growth medium, the improvement including highly supersaturating the aqueous slurry crystal growth medium. Also, an agent such as an excess of caustic may be added to the aqueous crystal growth medium to limit the growth rate of individual crystals.

8 Claims, No Drawings

PRODUCTION OF SODIUM PERBORATE CRYSTALS HAVING IMPROVED ABRASION RESISTANCE

CROSS REFERENCE TO EARLIER FILED APPLICATION

This application is a continuation-in-part of application Ser. No. 07/607,756, filed on Oct. 31, 1990, abandoned.

BACKGROUND OF THE INVENTION

The present invention relates to an improved method for preparing abrasion resistant crystals of sodium perborate tetrahydrate, and, more particularly, to a method for preparing such abrasion resistant crystals from an aqueous slurry of sodium perborate tetrahydrate using vacuum crystallization while continuously removing small nuclei, i.e., generally less than 20 microns, from the crystallization medium.

The preparation of sodium perborate tetrahydrate by a method to which this invention is particularly applicable is described in U.S. Pat. No. 2,828,183. Hydrogen peroxide is reacted with sodium metaborate in an aqueous slurry of sodium perborate tetrahydrate at a temperature of at least about 20° C., but preferably at a temperature in the range of from 25° to 40° C. A sodium tetraborate concentration of at least 8 grams per liter is maintained in the liquid phase crystallization medium. The hydrogen peroxide and sodium metaborate feed rates are proportioned so as to avoid an excess of hydrogen peroxide in the liquid phase. Sodium perborate tetrahydrate is crystallized from the liquid phase, and the sodium perborate tetrahydrate crystals which form can then be separated from the crystallization medium by filtration or centrifugation and then dried to remove adhering moisture. While the crystals which are obtained are resistant to caking at elevated temperatures and exhibit generally good pouring characteristics, they are not resistant to abrasion, i.e., dust and fines are likely to result during handling and subsequent processing.

The present invention provides a method for preparing sodium perborate tetrahydrate crystals which have the desired abrasion resistance as well as good pouring and anti-caking characteristics.

SUMMARY OF THE INVENTION

The present invention is an improvement in a method for making sodium perborate tetrahydrate crystals by reacting sodium metaborate with hydrogen peroxide in an aqueous slurry crystal growth medium, the improvement comprising highly supersaturating the aqueous slurry crystal growth medium with sodium perborate tetrahydrate during the crystallization of the sodium perborate tetrahydrate. One way to achieve this is by continuously removing small, i.e., less than 20 microns in size, nuclei from the medium. The small nuclei can be returned or recycled to the aqueous slurry, i.e., the mother liquor composition, by first dissolving them in a heated mother liquor recirculating stream which is maintained at a temperature higher than the aqueous slurry and which is arranged for that purpose.

The preparation of sodium perborate tetrahydrate described hereinabove employs a mother liquor composition having a $Na_2O/B_2O_3$ molar ratio less than 1.0, and usually in the range of from 0.6 to 0.8. According to one aspect of the present invention, it has now been found that by including an agent to limit the growth rate of individual crystals, such as by including an excess of caustic in the aqueous crystal growth medium by maintaining the $Na_2O/B_2O_3$ molar ratio at a value greater than 1, and preferably in the range of from 1.2 up to about 1.5, while highly supersaturating the aqueous crystal growth medium with sodium perborate during the crystallization of the sodium perborate tetrahydrate, it is possible to produce spheroidal particles of sodium perborate tetrahydrate comprising agglomerates of generally fine crystals which demonstrate substantially improved abrasion resistance.

DETAILED DESCRIPTION OF THE INVENTION

Sodium perborate tetrahydrate corresponds generally to the formula $$NaBO_3 \cdot 4H_2O$$

which may also be represented as $$NaBO_2 \cdot H_2O_2 \cdot 3H_2O$$

and is provided by reacting hydrogen peroxide with sodium metaborate in an aqueous slurry of sodium perborate tetrahydrate crystals while avoiding the presence of free hydrogen peroxide in the liquid phase of the slurry. Such a process is described in greater detail in U.S. Pat. No. 2,828,183, the teachings of which are incorporated herein by reference. The aqueous slurry, i.e., mother liquor composition, is maintained with a $Na_2O/B_2O_3$ molar ratio of less than 1, and usually in the range of from 0.6 to 0.8. The desired product, sodium perborate tetrahydrate, forms as crystals in the mother liquor composition. When all reactants have been added, the crystals are then separated by filtration or by centrifugation and then dried by usual techniques to remove adhering moisture.

Crystallization involves two steps: the crystals must first form and then grow to the desired size. Formation of new crystals is termed nucleation. Uniformity of a crop of crystals depends generally on the relationship between nucleation and growth. It has been found according to the present invention that by highly supersaturating the aqueous slurry crystal growth medium with sodium perborate during the crystallization of the sodium perborate tetrahydrate by, for example, continuously removing small nuclei, i.e., nuclei generally 20 microns and smaller in size from the aqueous slurry, single tetrahydrate crystals form which are free of dendritic surface growth and which are substantially more resistant to abrasion than if the small nuclei had not been removed.

According to a second aspect of the invention, the inclusion of an agent in the aqueous slurry crystal growth medium to limit the growth of individual sodium perborate tetrahydrate crystals, coupled with high supersaturation of the crystal growth medium, produce crystals that exhibit a quasi-spherical morphology in which the particles have a generally smooth surface and demonstrate an unexpectedly high resistance to abrasion.

The term "supersaturation" may be defined as containing an amount of a substance greater than that required for saturation, and in the present case means having a concentration of sodium perborate tetrahydrate at a specific condition (such as temperature or pressure) in excess of the concentration of sodium perborate tetrahydrate necessary for saturation at that specific condition.

The terms "highly supersaturated" or "high supersaturation" as used herein are defined as a difference between the actual concentration of sodium perborate tetrahydrate in solution and the saturation concentration of sodium perborate tetrahydrate at the crystallization temperature of greater than 50 grams per liter and preferably greater than about 84 grams per liter. Preferably, the supersaturation is not so high that homogenous nucleation occurs. Homogenous nucleation, which occurs at the highest levels of supersaturation, occurs when a solution is so supersaturated that nucleation occurs with no nuclei sites to start the nucleation. High supersaturated of the aqueous slurry crystal growth medium encourages surface nucleation on existing sodium perborate tetrahydrate crystals, and may be achieved in several ways. One way to achieve the high supersaturation is by continuously removing small, i.e., less than 20 microns in size, nuclei from the medium. The small nuclei can be returned or recycled to the aqueous slurry, i.e., the mother liquor composition, by first dissolving them in a heated mother liquor recirculating stream which is maintained at a temperature higher than the aqueous slurry and which is arranged for that purpose.

Another way to achieve high supersaturation is to saturate the aqueous crystal growth medium at an initial temperature that is significantly higher than the crystallization temperature, Increasing the initial temperature of the medium increases its solubility; therefore, upon cooling to the crystallization temperature, the medium is supersaturated. Increasing the difference between the initial temperature and the crystallization temperature increases the degree of saturation. In the present case, the initial temperature of the medium, which would normally be about 50° C. for crystallization at 35° C., can be increased to 70° C. or higher for crystallization at 35° C.

Yet another way to achieve high supersaturation is to maintain the temperature of the aqueous crystal growth medium while decreasing the temperature at which the medium is crystallized. Typically, this crystallization can take place at about 35° C., but can be decreased to 20° C. or lower.

Yet another way to achieve high supersaturation is to feed the hydrogen peroxide and the sodium metaborate to the medium at higher concentrations. The net effect of doing so is to decrease the concentration of water in the medium.

Another way to achieve high supersaturation is to increase the rate of removal of water from the aqueous crystal growth medium. For example, if water is removed by pulling a vacuum on the crystallizer, the rate of water removal can be increased by increasing the vacuum. Alternatively, both the temperature of the medium and the crystallization temperature can be increased.

Still another way to achieve high supersaturation is to keep the total particle surface area available for crystallization low by controlling the slurry density and/or the particle size distribution. The term "slurry density" as used herein is intended to mean the density of sodium perborate tetrahydrate crystals in the slurry. Decreasing the slurry density decreases the total sodium perborate tetrahydrate particle surface area that is available for crystallization, which concomitantly keeps more sodium perborate in solution, thereby increasing the supersaturation of the medium. Controlling the distribution of sodium perborate tetrahydrate particle size affects the supersaturation because if, for example, the smaller size sodium perborate tetrahydrate particles are removed from the medium, there is less particle surface area available for crystallization and more perborate is maintained in solution, which increases the supersaturation of the medium.

As described previously, sodium perborate tetrahydrate is produced by the reaction of sodium metaborate and hydrogen peroxide according to the following equation:

$$NaBO_2 + H_2O_2 + 3H_2O = NaBO_2 \cdot H_2O_2 \cdot 3H_2O$$

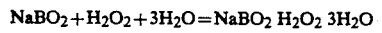

The $NaBO_2/H_2O_2$ (metaborate/peroxide) molar ratio should be greater than 1.0 so that the presence of free hydrogen peroxide in the reaction medium, i.e., mother liquor composition, is avoided. The starting reaction mixture can be a slurry of sodium perborate tetrahydrate crystals (referred to generally as perborate crystals) in mother liquor from a preceding preparation.

The hydrogen peroxide solution can be almost any commercially available peroxide solution which is free from impurities which will affect crystal growth. Generally speaking, for a continuous process hydrogen peroxide solutions containing not more than about 35% by weight hydrogen peroxide produce the best results in terms of crystal hardness.

The sodium metaborate solution will normally contain from about 20 to about 40 weight percent metaborate. Depending on which aspect of the invention is employed, the sodium metaborate and/or the hydrogen peroxide solutions are fed into the reaction mixture at a rate which will maintain the desired $NaBO_2/H_2O_2$ molar ration, which is generally greater than 1.0.

In practice, the mother liquor composition will be recycled with the sodium metaborate solution as a means of controlling solution concentration, recovering contained borax values and/or avoiding waste stream discharges.

The process of the invention employs either a batch or continuous crystallizer. The crystallizer can be equipped for continuously removing nuclei which are 20 microns in size and smaller from the reaction medium. On a pilot or smaller scale, a crystallizer of the type described and capable of operating at a temperature of up to about 50° C. can include a draft tube with an agitator for gentle circulation of the reaction mixture. During operation a quiescent zone is formed in the space above the draft tube, and particulate solids circulating within the crystallizer are classified with the fraction of small nuclei accumulating in the quiescent zone. Temperature control is provided by a jacket surrounding the crystallizer through which a coolant is circulated to maintain the temperature of the reaction medium. The sodium metaborate and hydrogen peroxide reactants are fed to the crystallizer at a controlled rate to maintain the desired concentrations of reactants, and means for continuously withdrawing the slurry crystal product which forms is provided.

The nuclei removal system comprises a circulating pump which is capable of recycling a flow of slurry at a controlled rate from the quiescent zone in the crystallizer through a heater, during which the small nuclei are dissolved, and back to the crystallizer at a location below the quiescent zone. The recycled flow of slurry, which contains the small nuclei, is heated to a temperature above the operating temperature of the crystallizer, i.e., above 20° C., but generally not above 50° C., which causes the nuclei to dissolve in the slurry before the flow of slurry is returned to the crystallizer.

On a larger, commercial scale, the improved process for preparing sodium perborate tetrahydrate according to the invention will include a crystallizer with an integral or separate classifier. The classifier functions to not only selectively remove the smaller undesirable nuclei from the reaction mixture, but it can also function to control the particle size of the final sodium perborate tetrahydrate crystals which are removed.

When the process is carried out substantially as described in U.S. Pat. No. 2,828,183, i.e., the $Na_2O/B_2O_3$ molar ratio of the mother liquor composition is maintained at a value less than 1.0, single sodium perborate tetrahydrate crystals are obtained which have rounded corners and are substantially free from dendritic surface growths. When the $Na_2O/B_2O_3$ molar ratio is also maintained at a value greater than 1.0, for example, at a value in the range of 1.5, quasi-spherical crystals are obtained which comprise agglomerates of fine crystals which demonstrate substantially improved abrasion resistance. In either case, the crystals which are obtained according to the process of the invention exhibit improved abrasion resistance over sodium perborate tetrahydrate produced by other process described in the prior art.

In the experiments which follow, the process was operated on a generally continuous basis using a nuclei removal system of the type having a draft tube as described above, and a starting reaction mixture, i.e., mother liquor composition, as described above was used. Laboratory experiments were conducted using a crystallizer having a working capacity of from 2 to 3 liters and equipped with a short draft tube and an agitator for creating gentle circulation. The crystallizer was charged with a starting amount of the reaction mixture, and the mixture was seeded with commercially obtained sodium perborate tetrahydrate crystals. The crystallizer was operated for an initial period during which the system reached a condition of equilibrium in terms of temperature, agitation, etc., and then the hydrogen peroxide and sodium metaborate feeds were begun. The metaborate feed rate was adjusted to control the $Na_2O/B_2O_3$ molar ratio of the starting mixture during the experiments. The crystals which were produced were withdrawn from the crystallizer as a slurry, separated, dried, screened and then subjected to a pneumatic attrition test. Two fractions of screen sizes were tested for each experiment, i.e., −20+40 mesh and −40+60 mesh. Attrition is expressed as a percentage of the selected sample which was reduced to less than 150 micrometers (a sample that will pass through a 100 mesh screen) when subjected to the test procedure described in International Organization for Standardization (ISO) 5937-1980.

EXAMPLE 1

Sodium perborate tetrahydrate crystals were produced substantially according to the process described in U.S. Pat. No. 2,828,183. The $Na_2O/B_2O_3$ molar ratio of the mother liquor composition was maintained at 0.75 without removing small nuclei which formed. The crystals which were obtained were somewhat branched having a dendritic surface. Attrition results were as follows:
−20+40 mesh: 6.2%
−40+60 mesh: 23.2%

EXAMPLE 2

Sodium perborate tetrahydrate crystals were prepared as in Example 1 using the same mother liquor composition. The nuclei removal system was used, and the crystals which were obtained were somewhat elongated, but there was no indication of branching or dendrites on the crystal surface. Attrition results were as follows:
−20+40 mesh: 9.1%
−40+60 mesh: 15.1%

EXAMPLE 3

Sodium perborate tetrahydrate crystals were prepared as in Example 1, but the $Na_2O/B_2O_3$ molar ratio of the mother liquor composition was maintained as 1.24. The nuclei removal system was used, and the crystals which were obtained were agglomerates of fine crystals having a generally smooth surface. Attrition results were as follows:
−20+40 mesh: 2.7%
−40+60 mesh: 7.5%

EXAMPLE 4

Sodium perborate tetrahydrate crystals were prepared as in Example 3, but the $Na_2O/B_2O_3$ molar ratio of the mother liquor composition was maintained at 1.45 while the nuclei removal system was in operation. The crystals which were obtained were agglomerates of fine crystals having a generally smooth surface. Attrition results were as follows:
−20+40 mesh: 4.0%
−40+60 mesh: 3.7%

EXAMPLE 5

An initial solution was saturated with sodium perborate tetrahydrate at 50° C. and kept in a heated reservoir at that temperature. The initial solution, which had a $Na_2/B_2O_3$ molar ratio of about 1.5, was infused into a chamber where the solution was cooled to 35° C. so that the solution was highly supersaturated. Sodium perborate tetrahydrate crystals precipitated from the solution as quasi-spherical agglomerates of fine crystals of the type shown in Examples 3 and 4 to have significantly decreased attrition.

What is claimed is:

1. In a process for preparing sodium perborate tetrahydrate crystals by reacting sodium metaborate with hydrogen peroxide in an aqueous crystal growth medium while maintaining an $Na_2O/B_2O_3$ molar ratio at a value less than 1.0 and while avoiding the presence of free hydrogen peroxide in the liquid phase and crystallizing the crystal growth medium at a crystallization temperature, the improvement which comprises:
   (a) supersaturating the aqueous crystal growth medium during crystallization by removing nuclei which are 20 microns in size and smaller from the crystal growth medium;
   (b) heating the nuclei in a side stream of crystal growth medium to a temperature at which the nuclei will dissolve; and
   (c) returning the side stream solution to the crystal growth medium.

2. A method for improving abrasion resistance of sodium perborate tetrahydrate crystals which are formed by reacting hydrogen peroxide and sodium metaborate in an aqueous slurry of sodium perborate tetrahydrate while avoiding the presence of free hydrogen peroxide in the liquid phase and crystallizing the aqueous slurry at a crystallization temperature, wherein the method comprises supersaturating the aqueous slurry during crystallization such that the concentration of sodium perborate tetrahydrate in the aqueous slurry is greater than 50 grams per liter above the saturation concentration of sodium perborate tetrahydrate at the crystallization temperature by continuously removing crystallization nuclei from the slurry which are 20 microns and smaller in size.

3. The method of claim 2 in which said nuclei are removed from said slurry by
  (a) forming a quiescent zone within said slurry;
  (b) classifying particulate solids within said slurry whereby nuclei which are 20 microns and smaller in size accumulate in said quiescent zone; and
  (c) continuously withdrawing said nuclei from said quiescent zone.

4. The method of claim 3 including the additional steps of
  (a) mixing withdrawn nuclei with a flow from the liquid phase of the slurry at a temperature above which the nuclei will dissolve, and
  (b) returning the flow to the slurry.

5. A method for improving the abrasion resistance of sodium perborate tetrahydrate crystals which comprises supersaturating a crystallization medium in which the sodium perborate tetrahydrate crystals are formed at a crystallization temperature such that the concentration of sodium perborate tetrahydrate in the crystallization medium is greater than 50 grams per liter above the saturation concentration of sodium perborate at the crystallization temperature by continuously removing crystallization nuclei which are 20 microns and smaller in size from the crystallization medium in which the sodium perborate tetrahydrate crystals are formed.

6. A process for preparing sodium perborate tetrahydrate crystals by reacting sodium metaborate with hydrogen peroxide in an aqueous crystals growth medium and crystallizing the aqueous crystal growth medium at a crystallization temperature, the improvement which comprises
  (a) maintaining a molar ratio of $Na_2O$ to $B_2O_3$ of from 1.0 to about 1.5;
  (b) supersaturating the aqueous crystal growth medium during crystallization by removing nuclei which are 20 microns in size and smaller from the aqueous crystal growth medium,
  (c) heating the nuclei in a side stream of aqueous crystal growth medium to a temperature at which the nuclei dissolve; and
  (d) returning the side stream to the aqueous crystal growth medium.

7. The process of claim 6, wherein the molar ratio of $Na_2O$ to $B_2O_3$ is maintained in a range of from 1.2 to about 1.5.

8. In a process for preparing sodium perborate tetrahydrate crystals by reacting sodium metaborate with hydrogen peroxide in an aqueous crystal growth medium while maintaining an $Na_2O/B_2O_3$ molar ratio at a value less than 1.0 to form a reaction mixture and while avoiding the presence of free hydrogen peroxide in the liquid phase of the reaction mixture and then crystallizing the reaction mixture at a crystallization temperature, the improvement which comprises:
  adding an amount of caustic to the reaction mixture prior to crystallization such that the $Na_2O/B_2O_3$ molar ratio in the reaction mixture is maintained at a value of from 1.0 to about 1.5 to limit the growth rate of the crystals, and
  supersaturating the reaction mixture during crystallization such that the concentration of sodium perborate tetrahydrate in the reaction mixture is greater than 50 grams per liter above the saturation concentration of sodium perborate tetrahydrate at the crystallization temperature.

* * * * *